United States Patent [19]

Kamm

[11] 4,049,500

[45] Sept. 20, 1977

[54] MANUFACTURING MACHINE

[76] Inventor: Lawrence J. Kamm, 1515 Chatswort Blvd., San Diego, Calif. 92107

[21] Appl. No.: 681,692

[22] Filed: Apr. 29, 1976

Related U.S. Application Data

[63] Continuation of Ser. No. 468,760, May 10, 1974, Pat. No. 3,998,316.

[51] Int. Cl.² .......................................... B65G 17/46
[52] U.S. Cl. .................................... 198/345; 214/89; 198/793
[58] Field of Search ............... 198/19, 127, 189, 181, 198/85; 269/55, 56, 58; 29/200 A; 104/166; 214/1 R, 89

[56] References Cited

U.S. PATENT DOCUMENTS

| 3,017,010 | 1/1962 | Wiggins et al. | 198/19 |
| 3,233,072 | 2/1966 | Garver et al. | 198/19 |
| 3,459,288 | 8/1969 | Clegg | 198/19 |
| 3,540,566 | 11/1970 | Perry et al. | 198/19 |
| 3,858,707 | 1/1975 | Block et al. | 198/19 |

Primary Examiner—Albert J. Makay
Attorney, Agent, or Firm—Ronald W. Reagin

[57] ABSTRACT

A manufacturing machine such as an automatic assembly machine is disclosed which includes a work station which can include linear motion devices and rotary motion devices. A conveyor system is disclosed for transporting a workpiece to and from the work station, and a positioning arrangement is disclosed for precisely positioning the workpiece to the work station.

1 Claim, 16 Drawing Figures

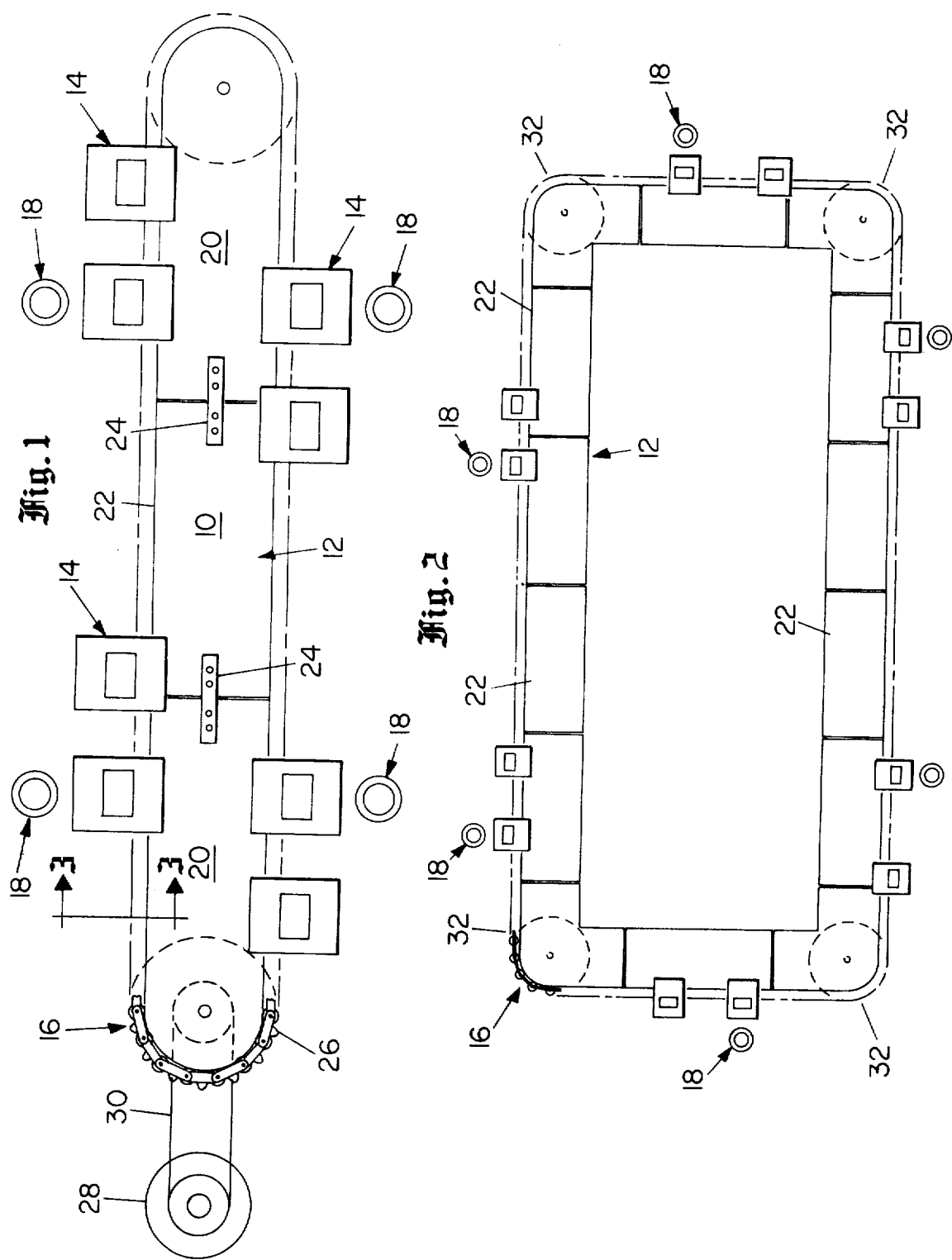

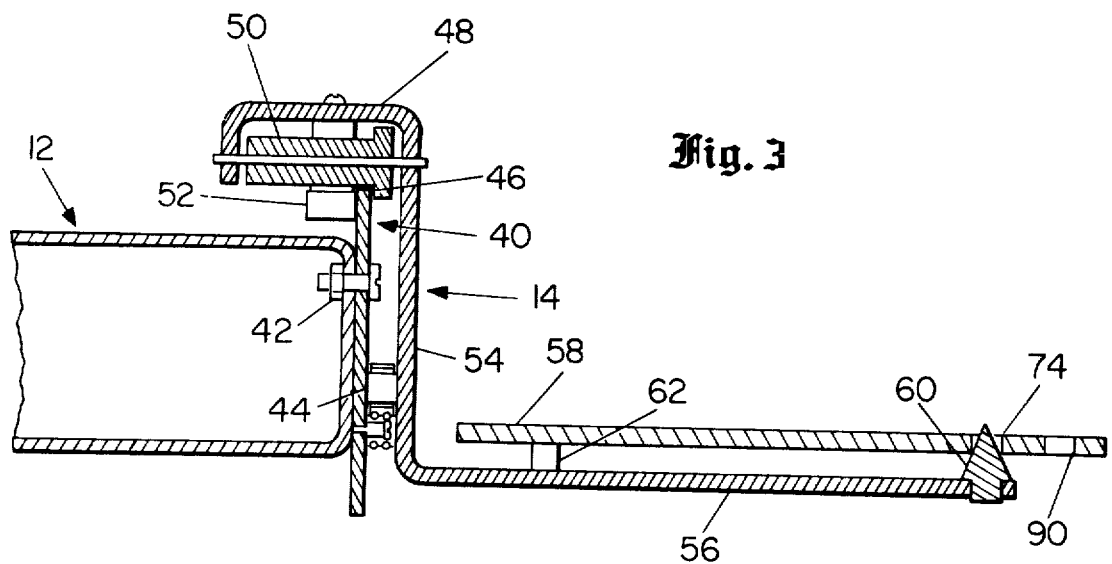
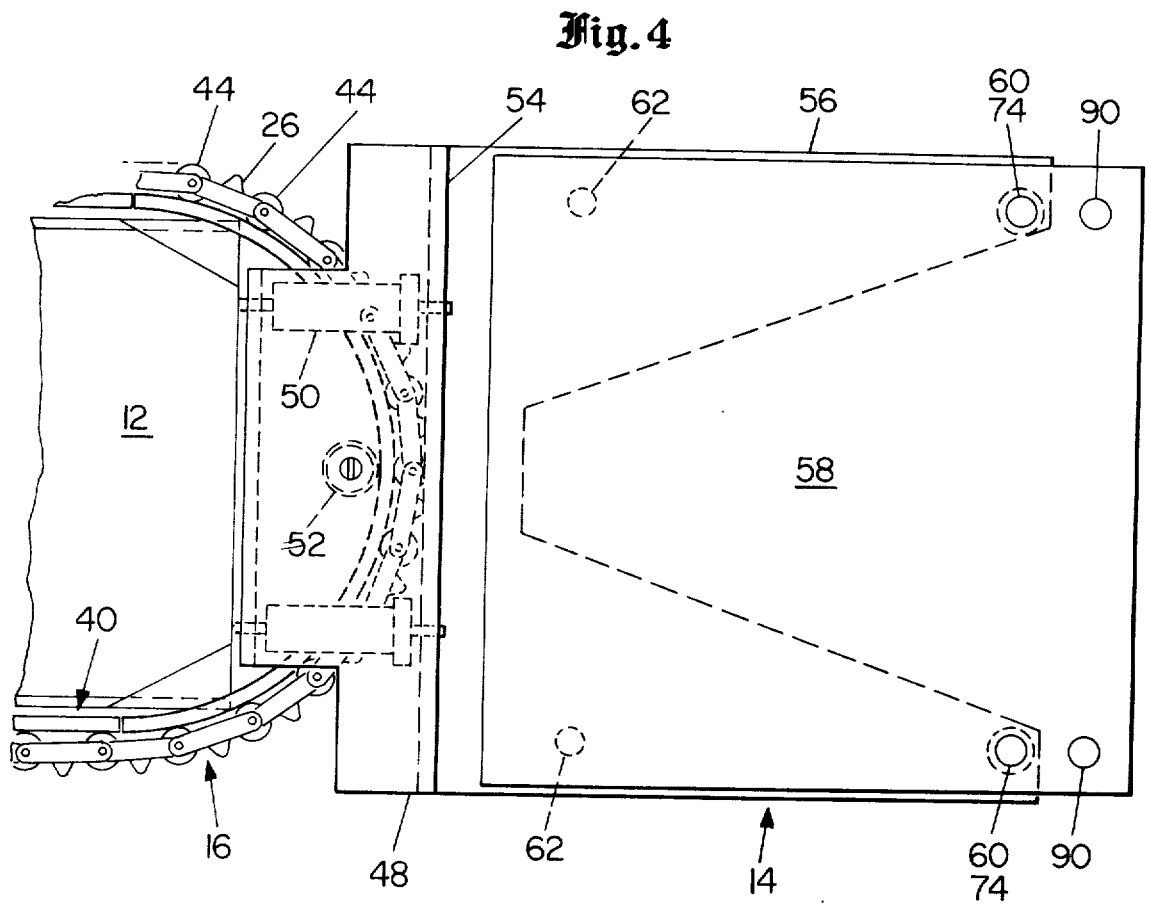

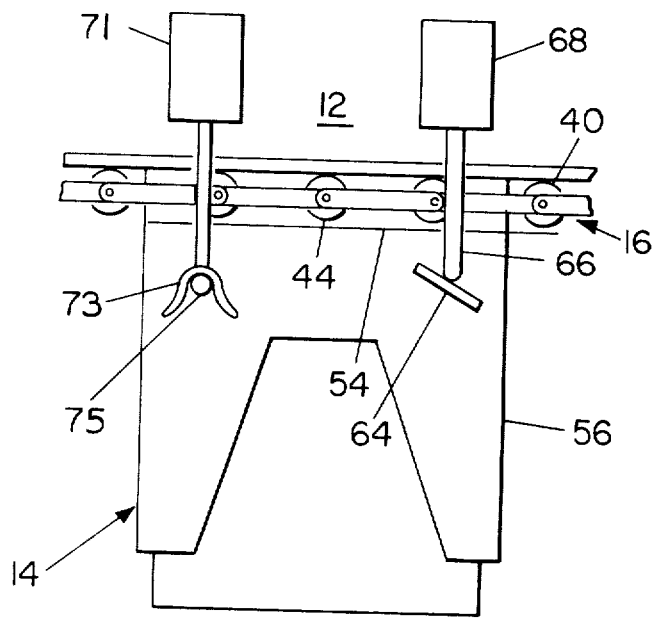
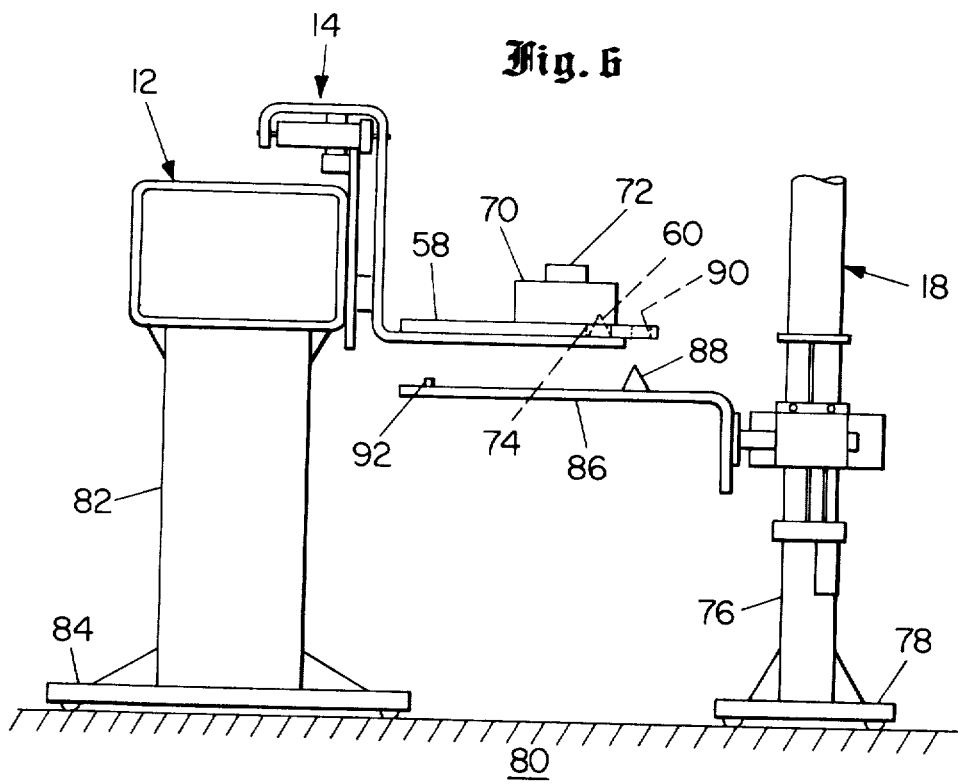

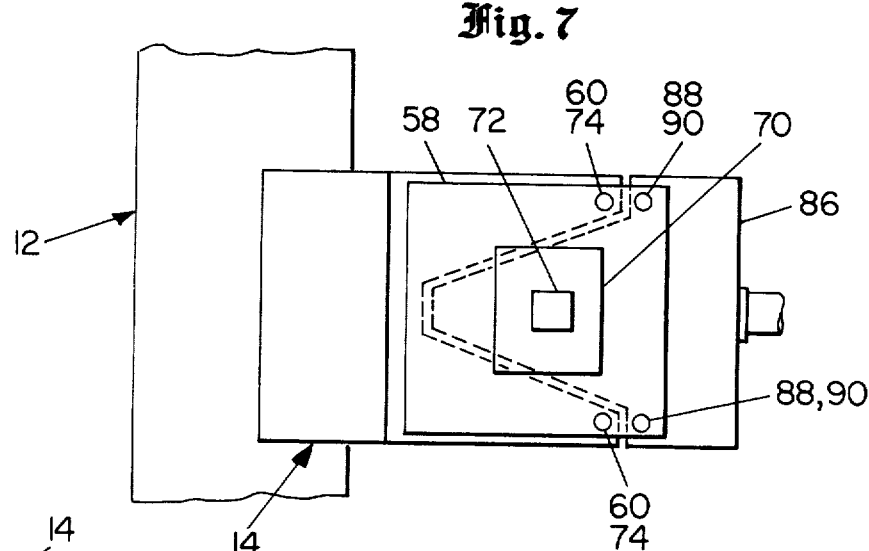
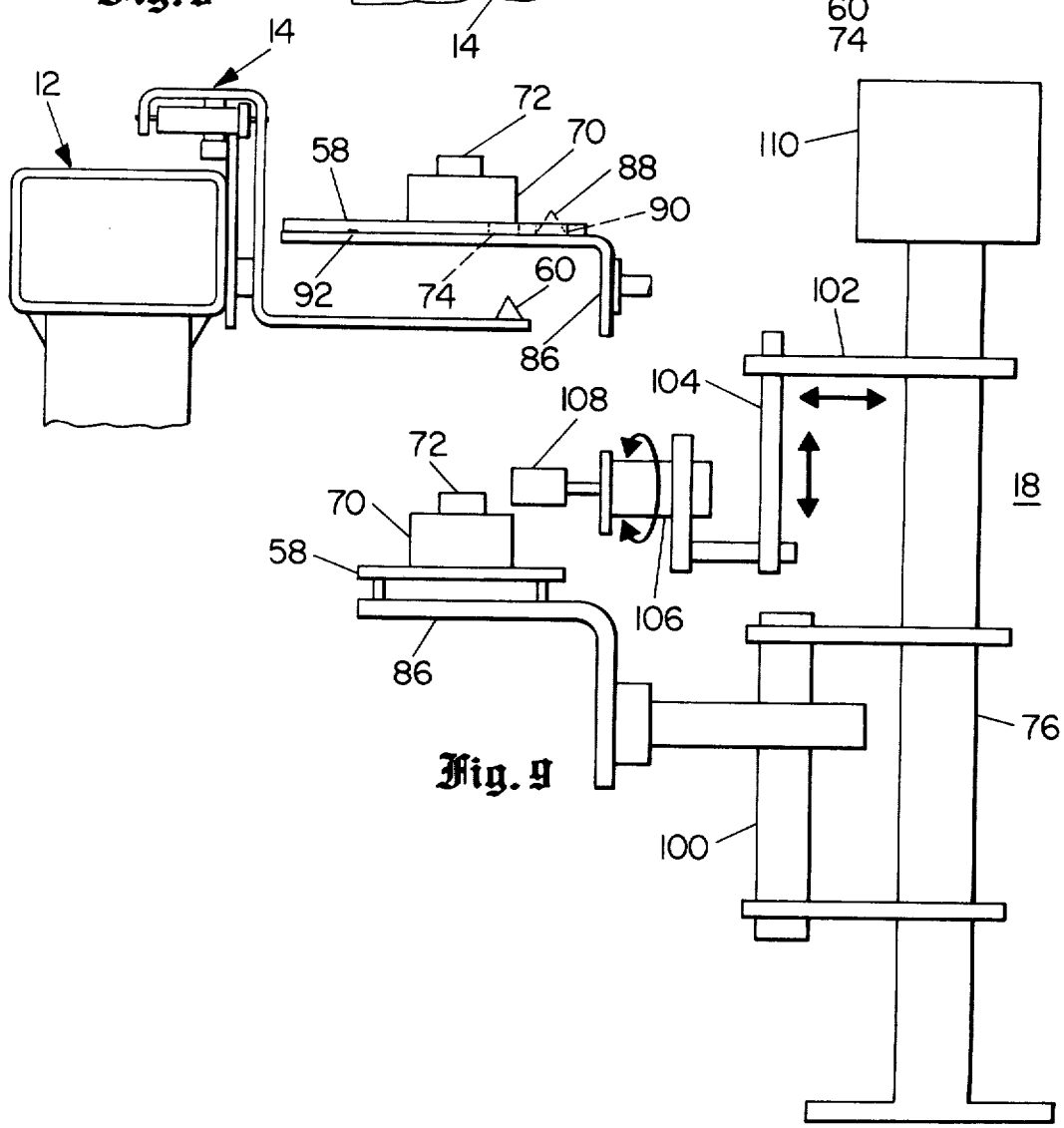

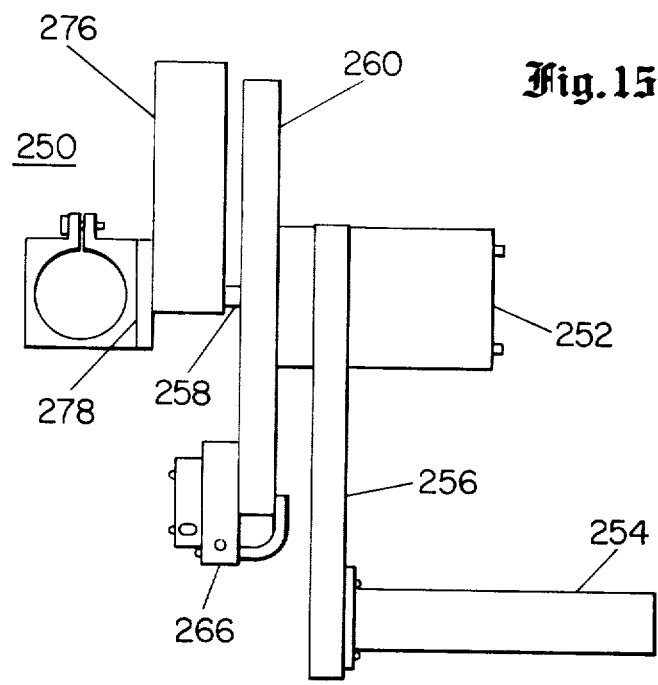
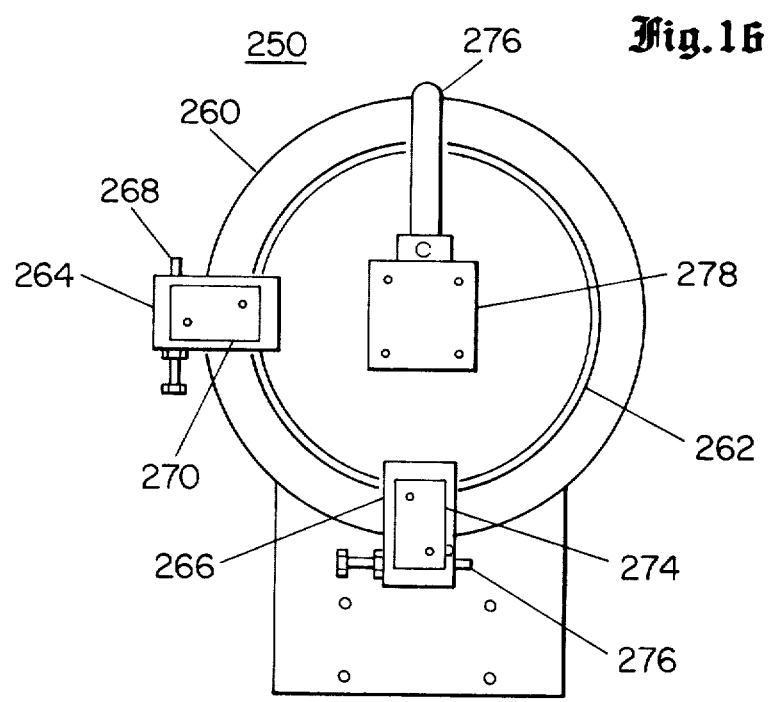

MANUFACTURING MACHINE

This is a continuation of application Ser. No. 468,760, filed May 10, 1974 now U.S. Pat. No. 3,998,316.

The present invention relates to manufacturing machines, and more particularly to machines such as automatic assembly machines in which a workpiece and suitable tooling are automatically manipulated relative to each other to assemble parts into the workpiece or otherwise advance the manufacturing process of the workpiece.

A number of forms of machines such as automatic assembly machines have been proposed and actually put into use in the prior art. One of the principal applications of such machines has been the automatic manipulation of parts and tools to assemble relatively complex assemblies out of simpler parts or components. In such machines, one or more work stations are provided, with a parts feeder or the like provided at each work station which supplies the parts to be added to the workpiece at the work station and a conveyor system interconnecting the work stations to transport the workpiece from work station to work station, with the workpiece becoming progressively more completely assembled at each work station.

At the work station, means are provided to position and hold the workpiece rigidly in place at the work station while suitable tooling at the work station manipulates the parts or components supplied to the work station by the part feeder to assemble these parts into the workpiece, thereby advancing the assembly of the workpiece. After the work station had completed its portion of work on the workpiece, the workpiece is advanced by the conveyor system to the next work station, where another assembly operation is effected on the workpiece.

Obviously, if accurate assembly of the workpiece with low tolerance is to be effected by the work station, the workpiece must be accurately positioned while it is being held at the work station during the assembly operation. In the prior art, this has usually been achieved by, in effect, the assembly machine being one large, monolithic structure, with the conveyor and all work stations being rigidly and accurately coupled to each other, usually by being secured to a common heavy metal base plate in which the mounting holes for the conveyor and the work station have been accurately machined, in order to permit accurate work by the work stations on the workpiece.

Such machines as have existed in the prior art have been of highly specialized design to perform the particular automatic assembly function on a particular type of workpiece. The biggest items and the cost of such machines has been for special engineering, fabrication and debugging, with only a relatively small portion of the cost being for standard modules. Some manufacturers have claimed the virtue of modularization for their machines, but such modules have usually consisted only of limited portions of the machine, such as conveyors and actuator drive chassis and special purpose mechanisms such as complex but limited pick and place assemblies.

Because of these above-mentioned limitations in the prior art, such automatic assembly machines have been of only limited utility, since their high cost can be justified only in manufacturing operations which produce large quantities of parts, such as at least several million parts per year of the same type. Because of this limitation, most such machines have been found in the automobile industry, which is one of the few manufacturing and assembly operations which require such large numbers of parts.

It is accordingly an object of the present invention to provide an improved manufacturing machine.

It is yet another object of the present invention to provide an improved automatic assembly machine which uses a maximum number of standard modules, and which requires little special engineering, fabrication and debugging.

It is a further object of the present invention to provide an improved automatic assembly machine of inherently high accuracy and reliability but of relatively low cost.

It is still another object of the present invention to provide a multi station automatic assembly machine in which lower accuracy is required in locating the work stations relative to the conveyor than is required in relating the work station and its tooling to the workpiece.

Briefly stated, and in accordance with the presently preferred embodiment of the invention, apparatus for automatically manipulating a workpiece is provided which included conveyor means for transporting a workpiece supporting platen to a work station at which the workpiece is to be manipulated. The conveyor means includes carriage means for supporting and transporting the platen and first support means for securing the conveyor means to the floor. Second support means independent of the first support means are provided for securing the work station to the floor. Elevator means secured to the second support means are provided for lifting the platen vertically from the conveyor means, and alignment means are provided for precisely positioning the platen relative to the work station. The alignment means includes at least two precision tapered pins on the elevator means and two mating precision alignment holes on the platen.

In accordance with the second feature of the invention, the apparatus may further include second alignment means for precisely positioning the platen relative to the conveyor means, the second alignment means including at least two additional precision tapered pins on the conveyor means and two additional mating precision alignment holes on the platen.

For a complete understanding of the invention, together with an appreciation of its other objects and advantages, please refer to the following detailed description of the attached drawings, in which:

FIG. 1 shows a plan view of a manufacturing machine in accordance with the present invention;

FIG. 2 shows a plan view of a second embodiment of a manufacturing machine in accordance with the present invention;

FIG. 3 shows a cross-sectional view taken along the lines 3—3 of FIG. 1;

FIG. 4 is a plan view of a carriage member as it is transported around the curved end section of the conveyor bed of FIG. 1;

FIG. 5 is a bottom view of one of the carriage members and a portion of the conveyor bed of FIG. 1;

FIG. 6 is an elevational view of a conveyor bed, a carriage member and a work station of FIG. 1, and illustrates relationship of these components before the platen has been lifted from the carriage member;

FIG. 7 is a top plan view of the arrangement of FIG. 6;

FIG. 8 is an elevational view similar to FIG. 6, but shows the relationship of the components after the platen has been removed from the carriage member;

FIG. 9 is a schematic representation of a typical work station in accordance with the present invention;

FIG. 15 is a side view of a typical rotary motion module in accordance with one of the features of the present invention; and FIG. 16 is an end view of the rotary motion module of FIG. 15.

FIG. 1 shows a plan view of a manufacturing machine such as an automatic assembling machine in accordance with the present invention. It is noted that some portions of the machine of FIG. 1 are merely shown schematically, with the details of these portions of the machine being shown and described in subsequent figures.

Figure 10:
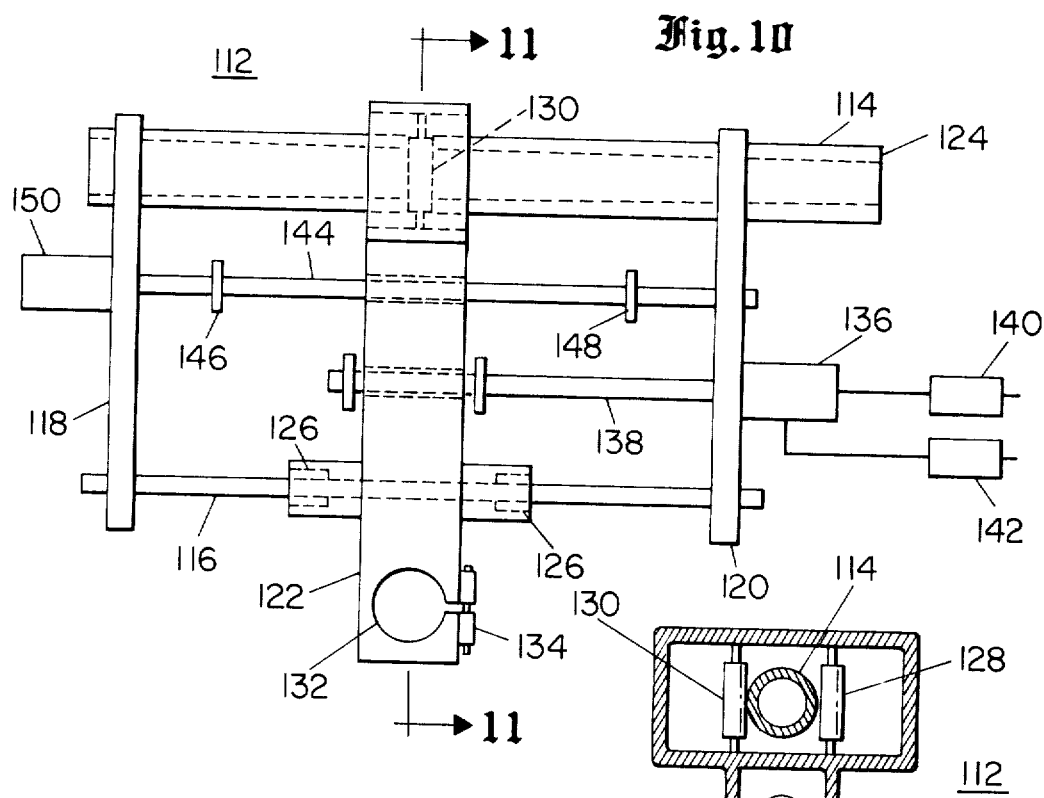
FIG. 10 is a plan view of a typical linear motion module in accordance with one of the features of the present invention.

As is shown in FIG. 1, the machine includes a conveyor system 10 which itself comprises a conveyor bed 12, a plurality of carriage members 14 and a drive chain 16 which carries the carriage members 14 around the perimeter of the conveyor bed 12. As is shown in more detail in FIGS. 3 through 8 below, the carriage member 14 includes means to carry a workpiece upon which assembly operations are to be performed. Drive chain 16, which may be a conventional roller chain, transports the carriage members 14 around the perimeter of the conveyor bed 12 until they are adjacent one of the work stations 18, which is merely shown schematically in FIG. 1. Details of a typical such work station are shown in FIG. 9, and described below.

As is shown in FIG. 5, described below, means are provided to disengage the carriage member 14 from the drive chain 16 when the carriage member 14 is adjacent one of the work stations 18, and further means are provided to remove the workpiece from the carriage member 14 so that the work station 18 may perform the desired assembly and manipulating operations on the workpiece. After the assembly and manipulating operations are completed by the work station 18, the workpiece is returned to the carriage member 14, which is then reengaged by the drive chain 16 to be carried to the next adjacent work station 18, where another assembly or manipulating operation is performed on the workpiece in a similar manner.

As is shown in FIG. 1, the conveyor bed 12 is itself a modular system, comprising two end modules 20 and any desired number of center modules 22, all joined by suitable splice plates 24.

Each of the end modules 20 includes a rotatably mounted horizontal wheel member 26, which in the preferred embodiment of the invention is a sprocket wheel whose teeth engage the links of the drive chain 16 and support the drive chain 16. In the preferred embodiment of the invention, one of the sprocket wheels 26 is also used to impart motion to the drive chain 16. For instance, an electric motor 28 or the like is provided which drives the sprocket wheel 26 through a belt 30 or the like.

FIG. 2 illustrates a similar manufacturing machine as is shown in FIG. 1, but in which the conveyor bed 12 has a hollow rectangular configuration instead of the narrow linear configuration of FIG. 1. The conveyor bed 12 of FIG. 2 is formed from eight center modules 22, such as are shown in FIG. 1, which are interconnected with four corner modules 32. Again, each of the corner modules 32 incorporates a rotatably mounted horizontal sprocket wheel which support the drive chain 16. In the embodiment of FIG. 2, six work stations 18 are shown positioned around the perimeter of the conveyor bed 12. The arrangement shown in FIG. 2 obviously allows the use of a larger number of work stations 18 and more efficient utilization of floor space in a factory or the like when a larger number of work stations is required to assemble a particular workpiece.

In either event, in both of the embodiments of FIGS. 1 and 2, it is seen that the conveyor bed 12 comprises a plurality of alternately disposed straight and arcuate sections, with each of the arcuate sections including a rotatably mounted horizontal wheel, such as a sprocket wheel, the perimeter of which defines the curved portion of the perimeter of the conveyor bed.

FIGS. 3 and 4 show details of the carriage member 14 and how it is transported about the perimeter of the conveyor bed 12 by the drive chain 16. FIG. 3 is a cross-sectional view taken along the lines 3—3 of FIG. 1 and FIG. 4 is a plan view of a carriage member 14 as it is transported around the curve end section of the conveyor bed 12 of FIG. 1. The following is a description of both FIGS. 3 and 4, with the same reference numerals being used in each figure to indicate the same parts and components.

As is shown in FIGS. 3 and 4, there is secured around the perimeter of the carriage bed 12 a vertical plate member 40, for example, by a bolt and nut 42 or the like. The roller elements 44 of the drive chain 16 roll against the outer surface of the vertical plate member 40, and the top portion 46 of the vertical plate member 40, which may be considered to be a carriage support rail, actually supports the carriage member 14 in a cantilever fashion, as is described below.

The carriage member 14 comprises a carriage body 48 to which are rotatably secured a pair of horizontally disposed roller elements 50 and a single vertically disposed roller element 52 which, as is best shown in FIG. 4, is positioned approximately midway between the horizontally disposed roller elements 50. As is shown in FIGS. 3 and 4, the roller elements 50 and 52 engage the top horizontal surface and vertical inner surface of the carriage support rail 46 and support the weight of the carriage member 14 in a cantilever fashion from the carriage support rail 46.

The carriage body 48 also includes a vertical drive plate section 54 which, when the carriage member 14 is being supported in the cantilever manner just described, rests against the outer surface of the roller elements 44 of the drive chain 16. Motion is imparted to the carriage member 14 by this vertical drive surface 54 engaging the roller elements 44 of the drive chain 16, and as is described in more detail below, this arrangement causes the carriage member 14 to be driven at a speed equal to twice the velocity of the drive chain 16 along the straight sections of conveyor bed 12 and at a speed equal to the velocity of the drive chain 16 along the arcuate sections of the conveyor bed 12.

Continuing the description of the carriage member 14, the carriage body 48 also includes a horizontally disposed load bearing section 56 which supports the workpiece which is to be transported between work stations by the conveyor system. For example, the workpiece (not shown in FIGS. 3 and 4) may be supported on a platen 58 which is itself removably supported on the portion 56 of carriage body 48 by the alignment pins 60 and the posts 62. The structure and function of the platen 58, the alignment pin 60, and the manner in which the platen is removed and replaced on the carriage member 14 are described in detail in connection with FIGS. 6, 7 and 8, described below, so no further description of this portion of the system is described in connection with FIGS. 3 and 4.

Referring now specifically to FIG. 3, it will be appreciated that, when the drive chain 16 is driven, the roller elements 44 rotate about their own axis because of frictional contact with the vertical plate member 40, and that the linear velocity of that portion of the outer surface of the roller element 44 which is diametrically opposed to the point of contact with the vertical plate member 40 is equal to twice the velocity of the drive chain. This portion of roller element 44 is the point which is actually in frictional or driving engagement with the vertical drive plate portion 54 of the carriage body 48. If one assumes no slippage between these surfaces, then the carriage member 14 is driven by the roller element 44 at a velocity equal to twice the velocity of the drive chain 16. Thus, the carriage members 14 are quickly driven between adjacent work stations.

However, referring now specifically to FIG. 4, it will be appreciated that when the roller elements 44 of the drive chain 16 enter the arcuate section of the conveyor bed 12, these roller elements 44 are engaged by the teeth of the sprocket wheel 26, and are carried around the arcuate section by these teeth, with no rotation being imparted to the roller elements 44 about their own axis. Now, since the vertical drive plate portion 54 of the carriage body 48 is still in contact with the outer surface of these roller elements 44, the carriage member 14 is carried around the arcuate portion of the conveyor bed 12 at a velocity equal to the drive velocity of the drive chain 16.

Those skilled in the art will readily appreciate that, since centrifugal force is a function of the square of the velocity of an object, the centrifugal forces on the carriage member 14 and on any workpiece being supported by carriage member 14 is only one quarter of the centrifugal force which would be on these elements if the velocity about the arcuate portion of the conveyor bed 12 were the same as it is along the straight portion of the conveyor bed 12. Thus, there is significantly less chance that the position of the workpiece on the conveyor bed 14 will change because of the centrifugal force and result in the workpiece being in the wrong position on the carriage member 14 when the carriage member 14 reaches the next work station.

FIG. 5, which is a bottom view of one of the carriage members 14 and a portion of the conveyor bed 12, shows the manner in which the carriage member 14 is disengaged from the drive chain 16 and is positioned with a high degree of accuracy relative to one of the work stations when the carriage member 14 reaches a position adjacent one of the work stations.

As is shown in FIG. 5, a ramp surface 64 is provided which is secured to the bottom surface of the load support section 56 of the carriage member 14. A controllable stop member 66, which may be driven by an air cylinder 68 or the like secured to the carriage bed 12, is provided, and the air cylinder 68 is energized to move the stop member 66 out into the path of the ramp surface 64 whenever it is desired to disengage the carriage member 14 from the drive chain 16. Now, when the drive chain 16 moves the carriage member 14 into the stop member 66, the ramp surface 64 engages stop member 66, and the carriage member 14 is caused to rotate about the carriage support rail 46 of FIG. 3 (not shown in FIG. 5). When this occurs, as is shown in FIG. 5, the carriage drive plate 54 is moved outwardly away from contact with the surface of the roller element 44 of the drive chain 16, and motion is no longer imparted to the carriage member 14 by movement of the drive chain 16. Also, it will be appreciated by those skilled in the art that, when such a rotation of the carriage member 14 occurs, the center of gravity of carriage member 14 is moved slightly upwardly, and by proper design of the angle of the ramp surface 64 and the other dimensions of the carriage member 14, all of the kinetic energy in the moving carriage member 14 is smoothly and gradually transformed to potential energy. The carriage member 14 thus decelerates smoothly to a stop, with a minimum of shock and resultant position shift of any workpiece being carried by carriage member 14.

If desired, an additional cam system can be provided to effect even more accurate positioning of the carriage member 14 relative to a work station after the carriage member 14 has been disengaged from the drive chain 16 in the manner just described. As is shown in FIG. 5, a second air cylinder 71 or the like is provided which is mounted on the carriage bed 12 and which actuates a notched cam surface 73. This notched cam surface 73 engages a cam surface engaging member 75, such as a simple pin or the like, which is also secured to the bottom surface of the portion 56 of the carriage member 14. After the carriage member 14 is stopped in the manner described above, the air cylinder 71 is energized, and the notched cam surface 73 is extended to engage the pin 75. If the carriage member 14 has stopped in a position which is somewhat forward or behind the desired stopping position, the notched surface 73 engages the pin 75 and drives the pin into the center of the notched surface 73, thereby positioning the carriage member 14 in the desired predetermined position relative to the work station (which is, of course, not shown in FIG. 5).

In the preferred embodiment of the invention, the air cylinders and moving elements just described are secured to the carriage bed 12 and the ramp surface 64 and the pin 75 are secured to the carriage member 14. However, those skilled in the art will obviously appreciate that either or both of these arrangements may be reversed, if so desired.

In the preferred embodiment of the invention, and as was suggested in the plan drawings of FIGS. 1 and 2 above, buffer stations are provided immediately in advance of each of the work stations. These buffer stations reduce the overall cycle time of the system. When the carriage members 14 are advanced to the next work station, only the time required for carriage transfer from the buffer station to the adjacent work station need expire before the work stations can begin their operation. The longer time period required for carriage transfer from a work station to the buffer station of the next work station is effected simultaneously with the work station time. It is obvious that precise location of a carriage member 14 is not necessary when it is in one of the buffer station positions. Accordingly, at each buffer station it is only necessary to provide the air cylinder 68 to drive the stop member 66 into the path of the ramp surface 64.

As was noted in the beginning of this specification, one of the primary features of the present invention is that it is possible to achieve accurate positioning of the workpiece in the work station despite inexpensive, relatively non-accurate positioning of the work station relative to the conveyor system. FIGS. 6, 7, and 8 illustrate the means whereby this is achieved.

FIG. 6 is an elevational view of the conveyor bed 12, a carriage member 14 and a typical work station 18 and illustrates the relationship of these components before the platen 58 has been lifted from the carriage member, and FIG. 7 is a top plan view of the arrrangement of FIG. 6. The following description is a simultaneous description of FIGS. 6 and 7, with the same reference numerals being used to indicate the same elements and components in the drawings.

The carriage member 14 is supported on the conveyor bed 12 in the manner described above. Carriage member 14 supports separable platen 58, which holds workpiece holding tooling 70, which itself holds workpiece 72. Platen 58 is positioned, but not fastened, to carriage member 14 by means such as the tapered alignment pins 60 (also shown in FIG. 3) which engage mating holes 74 in platen 58.

The work station 18 includes a column 76 supported on a base 78 which is mounted in a fixed, but not necessarily accurately positioned relationship to the conveyor bed 12, such as by being bolted to a floor 80 to which the conveyor bed 12 is also bolted through the legs 82 and foot 84.

Section 81 also includes an elevator platform 86 which is positioned so that, when it is in the lower position, such as is shown in FIG. 6, it is located beneath the carriage member 14 and the platen 58.

In accordance with the present invention, the work station 18 itself includes alignment means such as a pair of tapered alignment pins 88 positioned on the upper surface of elevator platform 86. Mating alignment holes 90 are postioned in platen 58. Whenever elevator platform 86 is raised, such as by one of the linear motion modules described in FIGS. 10 through 14 below, the alignment pins 88 engage their mating holes 90 in platen 58 and the post 92 engages the bottom surface of platen 58 to provide secure, accurate positioning of platen 58 with respect to other tooling at work station 18 so that accurate work and assembling can be done despite the relatively non-accurate positioning of work station 18 with respect to conveyor bed 12. When the work is completed, elevator platform 86 is lowered back to the position shown in FIG. 6, and platen 58 is returned to carriage member 14, where it is again positioned by the tapered alignment pins 60 on carriage member 14 and the mating alignment holes 74 on platen 58.

FIG. 8 is an elevation view similar to FIG. 6, but shows the elevator 86 in its raised position, supporting the platen 58 in an accurate position relative to the other positions and tooling at work station 18.

To illustrate the effectiveness of this portion of the invention, typical machines have been built in which the taper pin diameters were approximately one inch, the work stations were positioned up to one quarter inch from their nominal positions and the carriage member stopping position was up to one quarter inch off of its nominal position. Still, platen transfer was effected and positioning accuracy within the work station was achieved within 0.001 inch.

While in the preferred embodiment, alignment means such as the tapered pins are positioned on the carriage member 14 and the elevator platform 86, while corresponding mating holes are provided in the platen 58, it is obvious that alignment pins could be provided on the platen and corresponding mating holes provided on the carriage member of the elevator platform. Also, alignment means other than tapered pins and mating holes could be used, so long as they are capable of providing the necessary translation to the platen to overcome any inaccuracies in the relative positioning of the conveyor bed and work station or any errors in the stopping position of the carriage member.

As was noted above, the principal purpose of an automatic assembly machine such as is being described in the specification is the manipulation of parts and tools. The previous portion of this specification has described how the workpiece is conveyed to the work station and then accurately positioned at the work station. The remainder of the specification describes the manner in which the work station performs its assembly operation on the workpiece after the workpiece is accurately positioned at the work station.

Most manipulating motions can be resolved into linear motion components and rotary motion components performed in a desired sequence. The present invention provides means to produce such motions by a chain of standardized motion modules coupled together, each module in the chain providing one component of the total desired motion. The motion modules are of standard design but have provision for adjustable stroke, speed, deceleration and multiple stop positions. The coupling of the motion modules into a chain is provided by standardized plug and socket joints, so that no special parts need be engineered or built for each application. Similar standardized plug and socket joints are utilized to mount the first motion module in the chain to the support column at the work station and for the attachment of a tool to the last module of the chain. It is the motion of the tool actually connected to the last module in the chain which performs the assembly operation or the like on the accurately positioned workpiece.

FIG. 9 is a schematic representation of a typical work station 18 in accordance with the present invention. As is shown in FIG. 9, the work station 18 includes a support column 76 which supports the elevator platform 86, which in turn supports the platen 58, the workpiece holding tooling 70 and the workpiece 72, in the manner described in FIGS. 6, 7 and 8 above. The elevator platform 86 is supported from column 76 by a linear motion module 100, such as is described in FIGS. 10 through 14, described below.

The column 76 also supports a chain of motion modules including a horizontal linear motion module 102 and a vertical linear motion module 104 such as are described in FIGS. 10 through 14 below. Vertical linear motion module 104 supports a rotary motion module 106, such as is described in detail in FIGS. 15 and 16 below. Rotary motion module 106 in turn supports the tool 108 which is to perform the actual manipulative procedure on the workpiece 72.

The column 76 also supports a control box 110 which controls the timing and sequence in which the motion modules 100, 102, 104 and 106 are actuated. By selectively energizing these motion modules, the workpiece 72 is properly positioned and the tool 108 can be moved left or right, up or down and rotated clockwise or counterclockwise.

Figure 11:
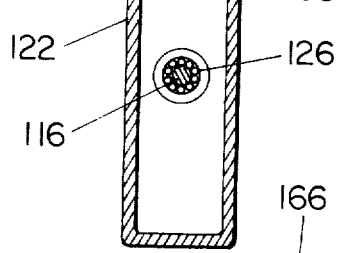
FIG. 11 is a cross-sectional view taken along the lines 11—11 of FIG. 10.

FIG. 10 is a plan view of a typical linear motion module 112 for use in the work station 18 of FIG. 9 above. FIG. 11 is a cross-sectional view taken along the lines 11—11 of FIG. 10. The following description is of FIGS. 10 and 11 simultaneously, with the same reference numerals being used to indicate like parts and components in the two drawings.

As is shown in FIGS. 10 and 11, the linear motion module 112 includes a stationary structure including a spar member 114, a shaft 116 and a pair of brackets 118 and 120 which support the spar 114 and the shaft 116 in spaced, parallel relationship. The linear motion module 112 also includes a moving member 122 which, as is described below, is attached to the spar member 114 and the shaft 116 for sliding reciprocal movement along a defined path parallel to the spar member 114 and shaft member 116 between limit stops supported by the stationary structure at predetermined positions along this defined path.

The components from which the linear motion module 112 is constructed are themselves designed to have maximum stiffness with minimum weight in order that the motion modules can be assembled in a cantilever manner to form a chain, as was shown in FIG. 9 above, with minimum bending or deflection of the chain. Thus, since the motion module 112 of FIG. 10 is intended to be supported in the general area of its end 124, the tubular member from which the spar 114 is constructed can be, if desired, constructed so that its walls are of a tapering thickness, as shown in FIG. 10, with the thicker portion of the wall being towards the end 124. Also, if the particular module is the first module in the chain and is intended for motion in a direction parallel to the support column of the work station, the support column itself can serve as the spar member 114.

Continuing the description of FIGS. 10 and 11, moving member 122 is guided on shaft 116, preferably by means such as ball bearings 126, and is prevented from rotating about shaft 116 by a pair of rollers 128 and 130. Rollers 128 and 130 are supported by moving member 122 and roll on the outer surface of spar member 114. The axle of roller 128 is rigidly fixed to the moving member 122 and the axle of roller 130 is spring loaded on moving member 122 towards spar member 114. If the ball bearings 126 have an interference fit on the shaft 116, this combination of bearings and rollers provides both zero looseness and zero binding at every point along the path through which moving member 122 moves. Fixed roller 128 and spring loaded roller 120 are positioned so that the fixed roller 128 is placed on the side which resists the external torque which is applied to moving member 122.

In the preferred embodiment of the invention, the components thus far described in linear motion module 112 are constructed from the following materials: Shaft 116 is preferably a precision ground and hardened round steel shaft and ball bearings 126 are preferably ball bushings, both of which are readily available as commercial components. However, if desired, non-round shafts, rolling ball bearings, or even non-rolling bearings could be used for these components. The spar member 114 is preferably of cold drawn steel tubing and need not be ground for most applications. Variations in diameter are absorbed by the spring loaded roller 130 and imperfect straightness does not effect the accuracy of repeatability of the stopping points. Moving member 122 is preferably of minimum weight and maximum stiffness, and is typically fabricated as a hollow box using commercial rectangular steel tubing modified by welding and machining.

Continuing the description of FIGS. 10 and 11, the end of the moving member 122 which is remote from the spar member 114 has a socket 132 therein in which another similar module or a tool holder may be mounted. Socket 132 is preferably made as a split hole closed by screws 134. Socket 132 is capable of supporting the spar member of another such linear motion module or a rotary motion module such as is described in FIGS. 15 and 16 below.

Moving member 122 is urged forward and backward along its defined path by suitable drive means such as fluid power piston and cylinder 136, typically an air cylinder, although hydraulic cylinders can be used. Cylinder 136 is preferably secured to the bracket 120 and drives the moving member 122 by the shaft 138. Flow control valves 140 and 142 control the speed and direction of energization of the cylinder 136.

Obviously, an electric motor driving a suitable arrangement such as a lead screw or a rack and pinion could also be used to move the moving member 122 along its defined path.

The travel ov moving member 122 is accurately limited in each direction by a stop assembly which includes a stop rod 144, a pair of limit stops such as adjustable stop nuts 146 and 148 and a control means 150, shown supported by bracket 118. When moving member 122 contacts either the stop nut 146 or 148, thereby moving stop rod 144 within control means 150, this provides a control signal indicating that the moving member 122 has reached the end of its defined path. Details of several such control means are shown in FIGS. 12 and 13, described below.

Figure 12:
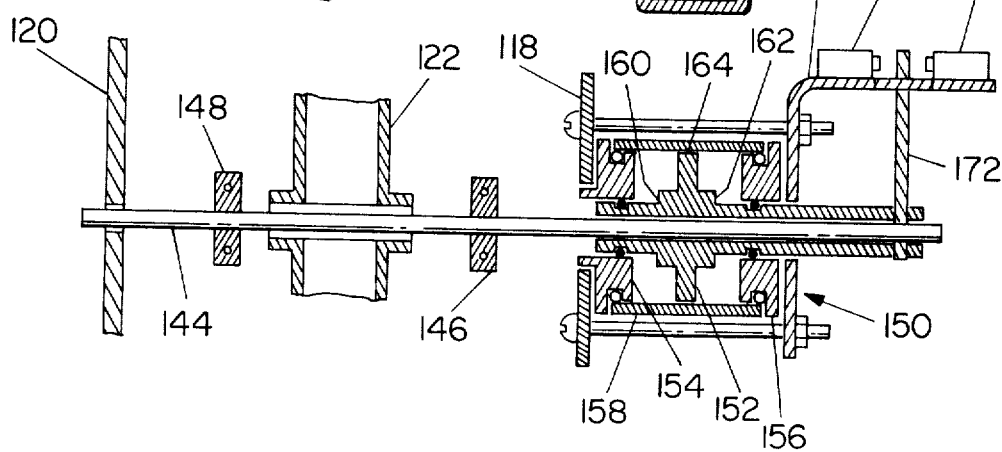
FIG. 12 is a cross-sectional view of a portion of a linear motion module of FIGS. 10 and 11, and illustrates details of the control means which responds to the moving member reaching the limits of its defined path.
Figure 13:
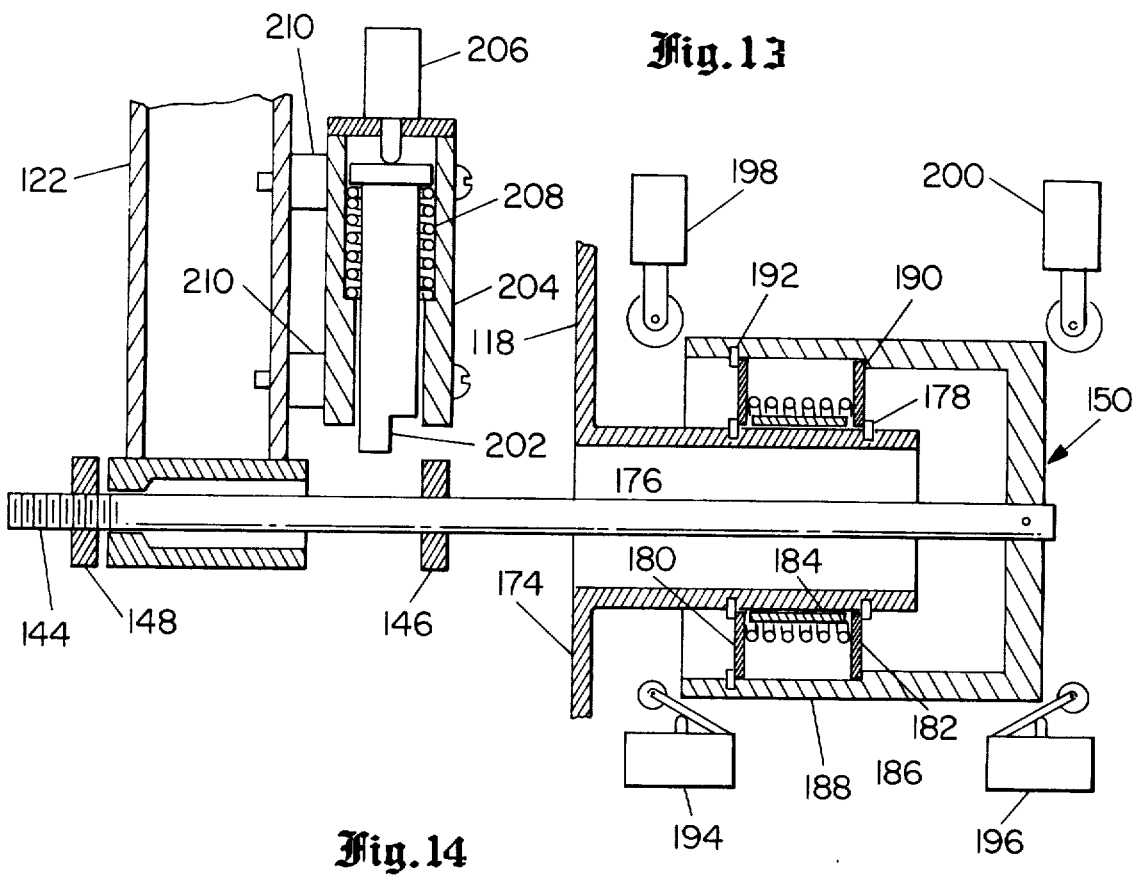
FIG. 13 is a cross-sectional view similar to FIG. 12, and illustrates another embodiment of the control means which may be used with the inventions.

FIG. 12 shows a cross-sectional view of a portion of the linear motion module of FIGS. 10 and 11, and particularly illustrates details of a preferred embodiment of the control means 150 which responds to the moving member 122 reaching the limits of its defined path. As is shown in FIG. 12, the stop rod 144 extends through the bracket 120, the moving member 122 and the bracket 118. Mounted on stop rod 144 is a piston 152 moving in a cylinder comprising cylinder heads 154 and 156 and a cylinder body 158. At one end position of piston 152's possible travel, surface 160 on the piston strikes cylinder head 154 and at the other end position, surface 162 on the piston 152 strikes cylinder head 156. There is a small clearance 164 between the piston and the cylinder body, and when the cylinder is filled with a fluid such as oil, that fluid passes slowly through this clearance, and causes a drag on the piston and therefore a slow creeping of the stop rod 144 as it approaches one of the above-mentioned end positions.

The control means 150 also includes a bracket 166 which supports a pair of limit switches 168 and 170 mounted on either side of an arm 172 which is secured to the stop rod 144.

In operation, whenever the moving member 122 is moving along any portion of its defined path other than the ends of its defined path, moving member 122 passes freely around stop rod 144. However, whenever moving member 122 approaches the end of its defined path, it strikes one of the stop nuts 146 and 148, and this imparts a movement to the stop rod 144. When this occurs, the above-described piston and cylinder arrangement provides a dashpot effect as the stop rod 144 moves the piston, and the assembly causes a hard stop of the stop rod 144, and thus of the moving member 122, when one face of the piston 152 strikes its respective end of the cylinder. At this time, the arm 172 actuates the appropriate one of the limit switches 168 and 170 to provide a signal indicating that the moving member 122 has completed its motion and is now at the end of its defined path.

In the preferred embodiment of the invention, in which air cylinders are used to drive the moving member 122, the cylinder remains energized, even though the moving member 122 is now being held firmly in its stationary end position, and the signal provided by the limit switches 168 and 170 are provided to the control box 110 (See FIG. 9) to indicate to the work station 18 that the portion of the stroke of the linear motion 112 has been completed. Obviously, if desired, this signal could also be used to deenergize the drive means for the moving member 122.

In a slight modification of the embodiment just described, if desired, a dashpot assembly could be used which does not have what is, in effect, a controlled leakage between the walls of the piston and the cylinder to interconnect the two ends of the cylinder. Instead, an external connection between the two ends of the cylinder could be provided, with a needle valve or the like in this external connection to control the amount of cushioning provided by the dashpot.

FIG. 13 shows a cross-sectional view similar to FIG. 12, and illustrates another embodiment of the control means 150 which may be used with the invention. As is shown in FIG. 13, a tube 174 is secured to the bracket 118. Tube 174 supports retaining rings 176 and 178, washers 180 and 182, stop sleeve 184 and centering spring 186. A stop member 188 is provided which is secured to the end of stop rod 144 and is supported radially by the washers 180 and 182. Axial movement of the stop member 188 is limited by shoulder 190 striking washer 182 and by retaining ring 192 striking washer 180.

In operation, when moving member 122 moves to the left in FIG. 13, it moves freely around stop rod 144 until it reaches the end of its defined path, at which time it strikes stop nut 148 and pushes stop rod 144 toward the left. When this occurs, stop member 188 pushes washer 190 against the resistance of centering spring 186 until washer 190 compresses stop sleeve 184 against washer 180 and retainer ring 176, which results in a hard stop of moving member 122.

Similarly, when moving member 122 moves to the right, it is stopped by pressure through the chain stop nut 146 — stop rod 144 — stop member 188 — retaining ring 192 — washer 180 — stop sleeve 184 — washer 182 and retaining ring 178.

Limit switches 194 and 196 are supported in any suitable manner (not shown in FIG. 13) by the bracket 118 and are operated by the stop member 188 at the corresponding limits of its travel. These limit switches may be either electrical or pneumatic, depending upon the medium preferred for the control and sequencing circuitry, and perform the same function as the limit switches 168 and 170 of FIG. 12. Accordingly, their function is not further described here.

Decelerating valves 198 and 200 are similarly supported by bracket 118 and are operated by the stop member 188 a short distance before the end of travel of the stop member 188. These valves switch speed control orifices in the power cylinder circuit, thereby permitting the cylinder to move faster in mid-stroke and slower at the ends of the stroke to minimize impact. In the case of electric motor drives, deceleration valves 198 and 200 may be replaced by electrical switches which have the same effect.

It is sometimes desirable that a linear motion module such as has been described have intermediate stops other than the two end stops which have been described. This can be achieved by mounting two or more linear motion modules in the chain with their shafts and spars parallel. However, intermediate stops may also be provided on a single linear motion module. In FIG. 15, an intermediate stop interposer 202 is guided in block 20 and is extended and returned by a solenoid or cylinder 206 and spring 208. This interposer assembly is mounted on spacers 210 on moving member 122. The length of these spacers determines the location of the intermediate stop. When interposer 202 is extended, such as by energization of the solenoid or cylinder 206, it strikes the stop nut 146 and moves the stop rod 144 just as the body of the moving member 122 does, but at a different position of moving member 122. When this occurs, motion of the moving member 122 is stopped in the same manner described above. Now, when it is desired for moving member 122 to leave the intermediate stop and continue to its end stop, the interposer 202 is retracted and operation continues as described above.

Figure 14:
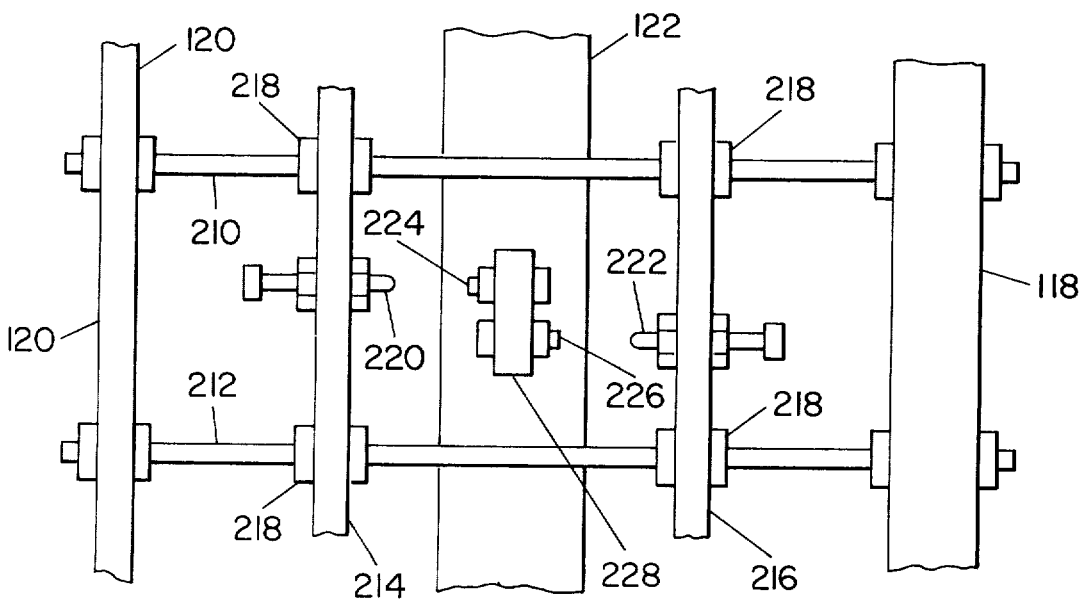
FIG. 14 is a plan view of a portion of the linear motion module of FIGS. 10 and 11, and illustrates a third embodiment of the control means which may be used with the present invention.

FIG. 14 shows yet another alternate embodiment to limit travel of moving member 122 and to provide control signals indicating that the moving member 122 has completed its journey along the predetermined path. A pair of threaded rods 210 and 212 are provided which are supported by the brackets 118 and 120. Insulators 214 and 216 are positioned along the threaded rods 210 and 212, as by nuts 218. By adjusting nuts 218, the position of the insulators 214 and 216 are moved, thereby defining the limits of the defined path through which the moving member 122 moves.

Insulator 214 carries a combination stop pin and electrical contact 220 and insulator 216 carries a combination stop pin and electrical contact 222. Combination stop pins and electrical contacts 224 and 226 are supported by insulator 228 on moving member 122. When the moving member 122 moves to the left and reaches the end of its defined path, the moving contact 224 strikes the stationary contact 220, thereby both limiting motion and closing a circuit (not shown) in FIG. 14, indicating that moving member 122 has reached the end of its defined path. Similarly, when moving member 122 reaches the end of its defined path to the right, moving contact 226 strikes stationary contact 222, again stopping motion and completing an electrical circuit.

It has been found in practice that, because the electrical contact pressure in this embodiment is the full drive cylinder force, typically many pounds, stainless steel stop pins perform quite well both mechanically and electrically, even though a control circuit voltage of only 24 volts is chosen for safety in exposed contacts and permissibility of non-armoured wiring.

FIGS. 15 and 16 illustrate a typical rotary motion module in accordance with the present invention. FIG.

15 is a side view of such a rotary motion module and FIG. 16 is an end view of the rotary motion module. The following is a description of these two figures simultaneously, with the same reference numerals being used to indicate like parts and components in the two drawings.

The rotary motion module 250 includes a stationary structure and a movable, rotating portion. The stationary structure includes a rotary cylinder 252 which is supported from a spar 254 by a bracket 256. Such rotary cylinders, in which a vane is rotated by application of air pressure or the like, thereby causing rotation of a shaft 258, and commercially available components. A typical such rotary cylinder is sold under the trade name ROTAC, made by the X-Cel-O Company. The dimensions of the spar 254 are chosen so that it fits into the socket of the moving member of the linear motion module described in the above figures, whereby the rotation motion module 250 may be positioned in a chain of such motion modules.

A mounting disc 260 is provided which is secured to the front of the rotary cylinder 252 and through which the rotating shaft 258 passes. A circular groove 262 is provided in the surface of mounting disc 260 and two stop blocks 264 and 266 are keyed and clamped in the groove 262 in disc 200. The stop block 264 carries an adjustable stop screw 268 and a limit switch 270. similarly, stop block 266 carries an adjustable stop screw 272 and a limit switch 274.

A moving member or arm 276 is carried by the cylinder shaft 258 and rotates with shaft 258 whenever the cylinder 252 is energized. In a manner similar to that described in the stop and limit mechanisms of the linear motion modules described above, the arm 276 rotates until it contacts one of the stop blocks 264 or 266, at which time a hard stop motion limit is provided and a control circuit is energized, through the appropriate limit switch, to indicate that the rotary motion has reached the end of its defined path.

The rotatable shaft 258 also carries a tool mounting flange 278 on which can be attached either a tool to perform a desired function on a workpiece or a spar mounting adaptor into which another motion module, either a linear motion module or a rotary motion module, can be plugged to complete or continue a chain of such motion modules, as was shown in FIG. 9 above.

It is obvious that, although no dashpot mechanism is shown in FIGS. 15 and 16, if it is desired to cushion the stop of arm 276 when it reaches the stop blocks 264 or 266, a dashpot assembly similar to the ones described above in connection with the linear motion modules could be added to the rotary motion module.

While the invention is thus disclosed, and several preferred embodiments described in detail, the invention is not limited to these shown embodiments and structures. Instead, many modifications will occur to those skilled in the art which lie within the spirit and scope of the invention. It is thus intended that the invention be limited in scope only by the appended claims.

What is claimed is:

1. Apparatus for automatically manipulating a workpiece, comprising, in combination:
    conveyor means for transporting a workpiece supporting platen to a work station at which the workpiece is to be manipulated,
    first support means for securing the conveyor means to a floor,
    second support means independent of the first support means for securing the work station to the floor at a location horizontally offset from the conveyor means,
    carriage means for supporting and transporting the platen, the carriage means including a pair of arms which extend under the platen,
    means for movably attaching the carriage means to the conveyor means in such a manner that the pair of arms are centilevered towards the work station,
    elevator means for lifting the platen vertically from the conveyor means, the elevator means being secured to the second support means such that the elevator means is cantilevered towards the conveyor means so that it can rise between the pair of arms of the carriage means to engage the underside of the platen,
    first alignment means for precisely positioning the platen relative to the work station, the first alignment means including at least two precision tapered pins on the elevator means and two mating precision alignment holes on the platen, and
    second alignment means for precisely positioning the platen relative to the conveyor means, the second alignment means including at least two additional precision tapered pins on the conveyor means and two additional mating precision alignment holes on the platen.

* * * * *